2 Sheets--Sheet 1.
K. McKINNON.
Cotton Choppers and Cultivators.
No. 153,837.    Patented Aug. 4, 1874.
FIG I
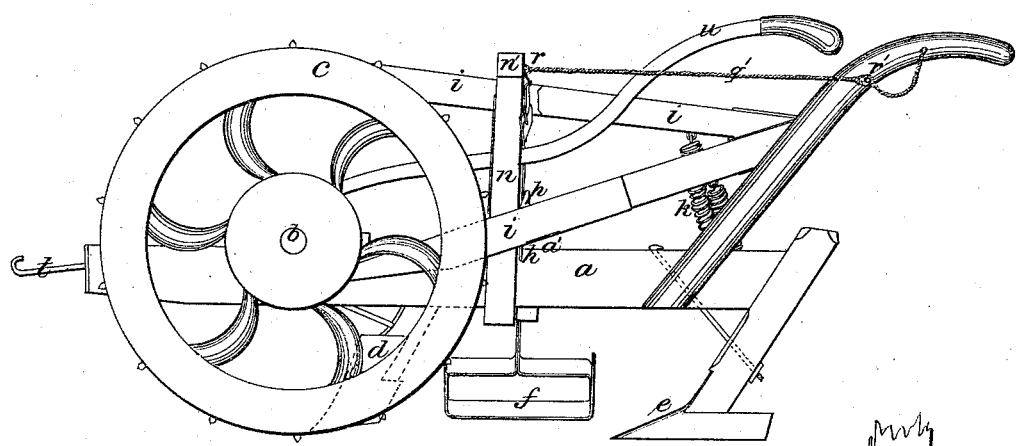
FIG II
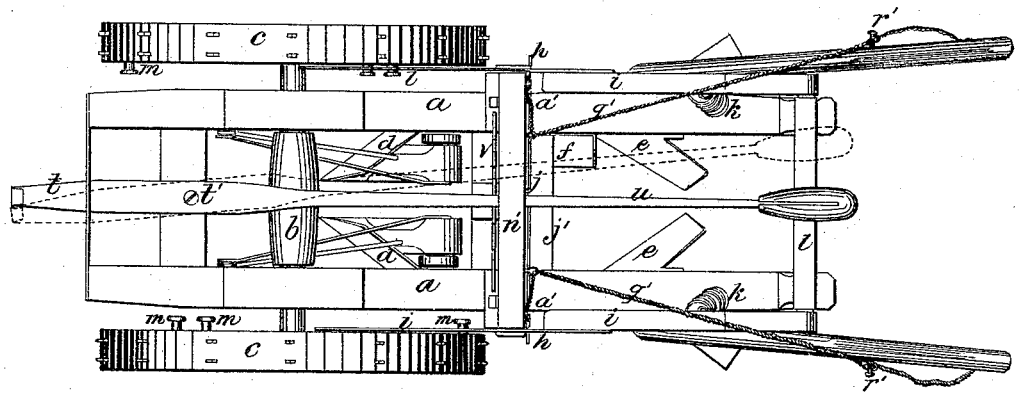
WITNESSES
J. Rutherford
John E. Laing
INVENTOR
Kenneth McKinnon
by Johnson and Johnson
his Attorneys 2 Sheets--Sheet 2.
K. McKINNON.
Cotton Choppers and Cultivators.
No. 153,837. Patented Aug. 4, 1874.
FIG III
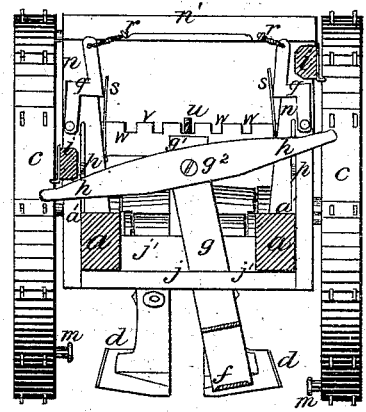
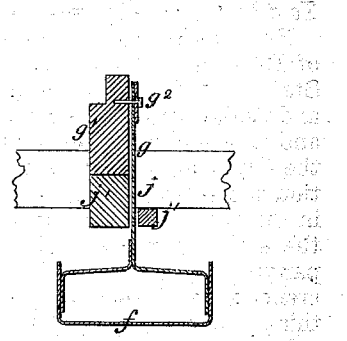
FIG IV
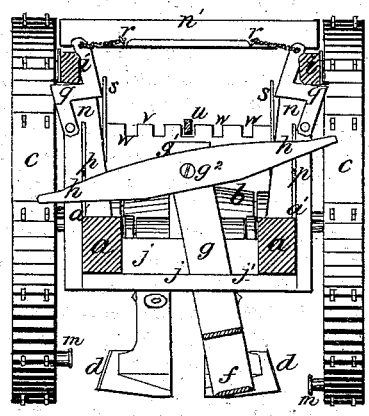
WITNESSES
J. A. Rutherford
John E. Laing
INVENTOR
Kenneth McKinnon
by Johnson & Johnson
his Attorneys.

UNITED STATES PATENT OFFICE.

KENNETH McKINNON, OF PLEASANT HILL, ALABAMA.

IMPROVEMENT IN COTTON CHOPPERS AND CULTIVATORS.

Specification forming part of Letters Patent No. 153,837, dated August 4, 1874; application filed June 6, 1874.

*To all whom it may concern:*

Be it known that I, KENNETH MCKINNON, of Pleasant Hill, in the county of Dallas and State of Alabama, have invented certain new and useful Improvements in Cotton Choppers and Cultivators; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to machines for chopping out or thinning rows of cotton-plants by means of a vibrating chopper, cutting its width out of the row at each stroke and leaving the cotton in small groups or bunches of three or four inches square, and the entire ridge is, at the same time, cleaned of grass and weeds, and the clean earth thrown back to "dirt" the cotton. To this end, my invention consists in the combination of a double-edged chopper, having a cross-head and pivoted to vibrate vertically in the arc of a circle over the cotton-ridge with spring levers, and the carrying-wheels provided with pins at suitable intervals, whereby the levers are raised alternately and forcibly depressed upon the cross-head arms to vibrate and carry the chopper across the cotton-ridge at stated intervals to chop and clean out a patch from the ridge of plants, the operating-pins being so disposed that the space cut out by the chopper and that occupied by the plants left are unequally divided along the row. Also, in the combination of the vibrating cross-head arms with spring catches, arranged to pass under and hold up the arms, as they are alternately raised to hold the chopper in position at one side of the row to be thrust across to the other side, whereby the chopper-arms, although free to be vibrated, are supported in their raised positions in a manner to allow the supports to readily yield and release the arms upon the descent thereon of the spring levers. Also, in the combination with the spring operating levers for the chopper, the spring catches, arranged to be under the control of the driver for the purpose of arresting the action of the spring levers, by supporting them out of the range of the acting-pins of the carrying-wheels, and thereby releasing the chopper from action and allowing it to be held to one side at its highest point of sweep. Also, in the combination with the levers for operating the chopper of a vertical guide-frame and the springs of the levers, whereby the levers are supported to receive the action of the lifting-pins, and to act upon the ends of the chopper cross-head by the tension of the springs to maintain the levers against their vertical guides.

In the accompanying drawings, Figure 1 represents a side elevation of a machine embracing my invention; Fig. 2, a top view; Fig. 3, a cross-section; and Fig. 4, a similar view with the chopper-operating levers shown supported out of action.

Upon a frame of two side timbers $a\ a$ the several parts of the machine are arranged with the axle $b$ of the carrying-wheels $c\ c$, near the forward end. The cultivating parts consist of double scrapers $d\ d$ just in rear of the axle, and sweeps $e\ e$ at the rear, and between these scrapers and sweeps the chopper $f$ is arranged to act across the ridge. The double scrapers $d\ d$ "side" the cotton-row, leaving a narrow strip of three or four inches, while the sweeps $e\ e$ run directly behind the scrapers and throw back to the plants a sufficient quantity of clean earth, over which the scrapers have run to dirt the cotton. The points of the sweeps are set inside of the line of the outer edges of the scrapers, so that what is carried out from the cotton-row by the scrapers is caught upon the outer wings of the sweeps and carried still farther toward the middle of the rows, and thus the entire ridge is freed from weeds and grass. Over this ridge the chopper vibrates to cut out its width from the plants at each cross-cut to leave the row in bunches about equal to one-fourth of the space cut out. The chopper is a double-edged cutter, $f$, secured to the lower end of an arm, $g$, pivoted to a central post at $g^1$, above the frame $a$, and provided at this point with a right-angled cross-head, the arms $h$ from which extend across and beyond the side timbers to receive the action of spring-levers $i\ i$, which, in their alternate descent, strike the arms and vibrating the cross-head cause the chopper to move with a thrust across the ridge in the arc of a circle, of which the cross-head pivot $g^2$ is the center. The arm $g$ passes through and vibrates within a guide, $j$, formed between horizontal cross-bars $j'$ to hold it secure and brace it against any endwise resistance upon the chopper as it passes through and cuts off the surface of the ridge, while the extent of the vibrations of the chopper is governed by the arms $h$, striking upon the side timbers at $a'$ $a'$, and thus serve as stops to their descent as well as to limit their upward throw. Upon these ends of the arms the levers $i$ $i$ are arranged to act by sudden descent produced by the tension of coil-springs $k$ secured to the levers near their rear ends, which levers are pivoted to the brace-bar $l$ of the handles, and, reaching forward, cross the ends of the cross-head and extend forward between a vertical frame, and the inner sides of the carrying-wheels in positions to be struck and elevated by pins $m$ projecting from the face of said wheels, so that when released from said pins they are pulled down for the purpose stated. These levers rise and fall in contact with the vertical frame, consisting of two standards, $n$ $n$, upon the side timbers $a$ $a$, and united by a top bar, $n'$, in a position in rear of the carrying-wheels, the direction of the pull of the springs $k$ being toward the center of the frame for the purpose of holding the levers against said standards as guides thereto, and thus always in position to receive the action of the lifting-pins. These pins $m$ are arranged at equal distances apart near the circumference of the wheels, so as to operate the levers alternately, and hence the chopper, so that the spaces cut out by the latter and that occupied by the cotton left in the ridge are equal, or nearly so.

It will be seen that at each vibration of the chopper it occupies a downwardly-inclined position from its pivot on one side of the row, and to hold it so against its tendency by its weight to be vertical, I arrange in the side of each standard $n$ a catch, $p$, forced out by a spring, so as to pass under the elevated arm $h$ of the cross-head and hold it up until struck by the thrusting-lever, when the arm readily passes the catch, and the other arm $h$ is caught and held up in the same manner. In this way the chopper is held at either side of the row until the lever descends to thrust it to the opposite side.

To put the levers out of action, I arrange catches $q$ on the sides of the uprights, above the catches $p$, for the cross-head arms, to the upper ends of which catches $q$ cords $q'$ are attached, which pass through eyes $r$ in the cross-bar of the standards and pass to the handles, where they are hooked over pins $r'$, and thus place the catches $q$ under the control of the operator. These catches are pivoted and constantly forced outward by springs $s$ on the inner sides of the standards, so that when the cords are hooked over the handle-pins $r$ the catches $q$ are drawn in to admit of the free movement of the levers; but when released these catches fly outward, and the levers passing above them are caught and held up above the range of the pins in the carrying-wheels, and thus stop the operation of the chopper.

It is very necessary that the machine should run in a straight line, and this is difficult to control from the handles. For this purpose I pivot the tongue $t$, at $t'$, near the front end of the frame, and extend it back to form a handle, $u$, within reach of the operator. To adjust this handle I arrange a notched bar, $v$, upon the standards $n$, so that the tongue-handle may be turned upon its pivot and adjusted in the notches $w$, at either side of the center line, and thereby assist in directing the machine and keeping it upon the cotton-row.

The wheels are made of cast-iron and provided with projections on their circumference to bite into the ground and prevent their sliding.

I claim—

1. The combination of a double-edged chopper, $f$, having cross-head arms $h$ $h$, and pivoted to be vibrated vertically across the cotton-ridge, with thrusting-levers $i$ $i$ and the carrying-wheels, having pins $m$, substantially as described, whereby the levers are raised and forcibly depressed upon the cross-head arms to vibrate the chopper at intervals to chop and clean out a space from the ridge of cotton.

2. The combination of the vibrating cross-head arms $h$ $h$ with the spring-catches $p$, as described, whereby the chopper is held in position to be thrust across from one side of the row to the other.

3. The combination of the thrusting-levers $i$ $i$, for operating the chopper with the spring-catches $q$ and their holding and releasing cords $q'$, whereby the action of the levers is arrested, and they are held up out of the range of their operating-pins.

4. The combination of the thrusting-levers $i$ $i$, for operating the chopper, with the vertical guide-frame $n$ $n$ and the springs $k$ $k$, as described, whereby the levers are held in position to receive the action of the lifting-pins and to act upon the cross-head arms.

In testimony that I claim the foregoing as my own, I have affixed my signature in presence of two witnesses.

KENNETH McKINNON.

Witnesses:
   JNO. A. McKINNON,
   J. J. FELLOWS.